Patented July 29, 1924.

1,503,194

UNITED STATES PATENT OFFICE.

THÉODORE LOMBARD, OF BASEL, SWITZERLAND, ASSIGNOR TO THE FIRM, DURAND & HUGUENIN S. A., OF BASEL, SWITZERLAND.

MORDANT DYESTUFFS AND PROCESS OF MAKING SAME.

No Drawing.   Application filed May 7, 1923.   Serial No. 637,353.

*To all whom it may concern:*

Be it known that I, THÉODORE LOMBARD, a citizen of the Swiss Republic, and resident of Basel, Switzerland, have invented new and useful Mordant Dyestuffs and Processes of Making Same, of which the following is a full, clear, and exact specification.

In the specification of the German Patent No. 119,863 mordant dyestuffs are described which are produced by the condensation of amino-oxycarboxylic acids of the benzol and naphthalene series with quinones (benzoquinone, chloranil, betanaphthoquinone). From the relative proportions specified therein, it is to be inferred that these products are mono-anilido compounds, resulting from the condensation of one molecular proportion of an amino-oxycarboxylic acid with one molecular proportion of quinone. These dyestuffs yield brown shades on chrome-mordanted fibre, but appear not to have attained any particular importance in practice.

I have found that such condensation products, formed by the reaction of two molecular proportions of an amino-salicylic acid body with one molecular proportion of chloranil, are transformed into new and valuable dyestuffs by treatment in concentrated sulfuric acid at raised temperature. These dyestuffs differ greatly from the dianilido compounds constituting the originating materials, and also from the dyestuffs described in the said German specification. Whilst the direct condensation product of an amino-salicylic acid body with chloranil dyes chrome mordanted fibre shades of brown of no particular value, the new dyestuff, obtained from the aforesaid treatment with concentrated sulfuric acid under heat, dyes very fast, dark violet-blue shades. The introduction of nitro groups into these new dyestuffs intensifies the tinctorial properties.

The new products it is considered will find most useful application in calico printing and in dyeing.

The new reaction appears not to be common to all bodies of this class, but to be confined to particular cases. This transformation of dianilido-dichlorquinones into new substances cannot be considered as in any way analogous to the processes described in the specifications of the German Patent 253,091 and its patents of addition in which dianilido- or dinaphthyl-aminobenzo-quinones in general are heated by themselves, or in solvents of high boiling point. The products resulting therefrom cannot be vatted, and must be sulfonated for use as dyestuffs. The process according to the present invention furnishes, at lower temperatures, mordant dyestuffs, at once suitable for use, the alkali salts thereof being soluble in water. It is restricted to substances derived, on the one hand, from a chlorinated benzoquinone, as for instance chloranil, trichlorotoluquinone, and, on the other hand, from para-amino-salicylic acid, or ortho-amino-salicylic acid, their analogues, homologues and derivatives.

The condensation of an amino-salicylic acid body with chloranil is effected, in a very simple manner, by warming them, in aqueous suspension and in the presence of sodium acetate as the acid-fixing agent. Thus, for example, para-amino-salicylic acid is condensed with chloranil as follows:—

In one litre of water are suspended forty-nine grams of chloranil (previously moistened with a little alcohol) and sixty-five grams of para-amino-salicylic acid, fifty-five grams of crystallized sodium acetate being added. The whole is heated to boiling for 4, or 5, hours and is kept stirred. Twenty-five to thirty cubic centimeters of concentrated hydrochloric acid are added to the mixture, which is then filtered hot. The product is washed with ten per cent hydrochloric acid, at from 40° to 50° centigrade followed by washing with water. The product is then pressed and dried, a yield of from 85 to 88 grams being obtained.

In place of para-amino-salicylic acid, use may be made of ortho-amino-salicylic acid, para-amino-ortho-cresotinic acid, nitro-amino-salicylic acid OH:COOH:NO$_2$:NH$_2$1:-2:6:4 and other derivatives of amino-salicylic acid.

Manners in which the invention may be performed are illustrated by the following examples:—

Example I.

20 grams of the condensation product from para-amino-salicylic acid and chloranil, prepared by the foregoing process, are stirred into 200 grams of concentrated sulfuric acid, of 98 per cent strength. The solution is heated to from 100° to 105° centigrade during from 3 to 4 hours. The color, which is, at first, blue-violet, gradually becomes pure blue. A sample, when diluted with water, should give a deposit of violet flakes. When filtered off and treated with sodium carbonate solution we obtain a red-violet solution, and a pure blue solution when the carbonate is in excess.

When the reaction has ceased, the product is allowed to cool and is poured into a litre of ice water. It is filtered, pressed, and stirred up with water, and the final traces of acid are neutralized, after which it is filtered again, and then pressed and dried. Printed on cotton, with chrome-mordant, the dyestuff obtained yields fast violet-blue shades; and on chromed wool it yields violet-blue shades which are fast on fulling.

The following comparison shews the difference between the dianilido-quinone, serving as the initial product, and the new dyestuff prepared therefrom.

|  | Dianilido-quinone (product prior to the treatment with concentrated sulfuric acid). | The new dyestuff (product after treatment with sulfuric acid). |
|---|---|---|
| Color of solution in concentrated H$_2$SO$_4$. | Blue-violet | Pure blue. |
| After dilution with H$_2$O. | Brown precipitate | Violet precipitate. |
| Color of solution in a 10% solution of Na$_2$CO$_3$. | Brown-yellow | Fuchsine red; with excess of soda, blue with greenish tinge. |
| Color of solution in NaOH (36° Bé.). | Fuchsine red; brown on dilution. | Violet; blue with greenish tinge on dilution. |
| Dyeing on chrome-mordanted fibre. | Brown | Violet, with bluish tinge. |

Example II.

A similar result can be obtained by using the dianilido compound from two molecular proportions of para-amino-ortho-cresotinic acid and one molecular proportion of chloranil.

The dyestuff prepared therefrom furnishes shades which are bluer than those obtained according to Example I.

|  | Product from amino-ortho-cresotinic acid and chloranil, prior to treatment with concentrated sulfuric acid. | Product after treatment with concentrated sulfuric acid. |
|---|---|---|
| Color of solution in concentrated H$_2$SO$_4$. | Blue-black | Green. |
| After dilution with H$_2$O. | Brown precipitate | Blue precipitate. |
| Color of solution in a 10% solution of Na$_2$CO$_3$. | Red-brown | Red, afterwards blue. |
| Color of solution in NaOH (36° Bé.). | Red-violet | Violet, blue on dilution. |
| Dyeing on chrome-mordanted fibre. | Brown | Navy blue. |

In place of the quinone-dianilide from para-amino-salicylic acid, use may be made of the analogous substance from nitro-amino-salicylic acid, OH:COOH:NO$_2$:NH$_2$-1:2:6:4. The dyestuff resulting in this case gives a deeper shade than that obtained by proceeding according to Example I. The same, or a very similar substance is obtained when the initial material for Example I (the condensation product from two molecular proportions of amino-salicylic acid with one molecular porportion of chloranil) dissolved in concentrated sulfuric acid is nitrated at a lower temperature. In this case the transformation under the influence of the concentrated sulfuric acid, according to the present invention, proceeds at a lower temperature than is the case without nitration and consequently the new dyestuff is obtained in a very simple manner by simultaneous nitration and condensation.

It has further been observed that this transformation of the quinone-dianilido bodies into the new dyestuffs in concentrated sulfuric acid is also favored and takes place at a lower temperature by the presence of oxydizing agents in the mass. For instance the quinone-dianilido body obtained from chloranil and para-amino-salicylic acid can be transformed into a new corresponding dyestuff in concentrated sulfuric acid and in presence of chromic acid at ordinary temperature. Chromic acid may also—with a similar effect—be replaced by other convenient oxydizing agents.

Example III.

24 grams of the same initial product as that used in Example I, are stirred into 240 grams of concentrated sulfuric acid. The solution is cooled down to zero centigrade and 42 grams of mixed acid (mixture of nitric and sulfuric acid) containing 15 per cent of $HNO_3$ are slowly dropped in, whilst the solution is stirred and the temperature prevented from rising above + 10° centigrade. As soon as all the mixed acid has been added, the refrigerating bath is removed, and the reaction mixture is allowed to become of ordinary temperature. It is then raised to 80° centigrade in the course of two hours, and maintained at between 80° and 90° centigrade for two hours longer when a sample dissolved in dilute caustic soda should yield a pure blue solution. After being cooled, the product is poured onto ice water and further treated in the manner described in Example I.

*Properties of the new product.*

| | |
|---|---|
| Color of solution in concentrated sulfuric acid. | Greenish blue. |
| After dilution with water | Red-violet precipitate. |
| Color of solution in 10% soda solution. | Red; blue with excess of soda. |
| Color of solution in caustic soda (36° Bé.). | Violet; blue on dilution with water. |
| Dyeing on chrome-mordanted fibre. | Blue, with reddish tinge. |

In this example, the initial product used in Example II (the condensation product from chloranil and para-amino-ortho-cresotinic acid) can also be used.

Nitration can also be effected in the final stage with similar results; that is, the operations are conducted in accordance with Example I, or Example II, and the product is nitrated in the solution in concentrated sulfuric acid after condensation.

*Example IV.*

24 grams of the same initial product as that used in Example I, are stirred into 240 grams of concentrated sulfuric acid, and the solution is heated to from 100° to 105° centigrade for 3, or 4 hours. After cooling the solution is nitrated, as in Example III, with 42 grams of 15 per cent mixed acid, and is finally warmed to from 30° to 40° centigrade for an hour and then allowed to cool and afterwards treated as hereinbefore described.

*Example V.*

48 grams of the same initial product as that used in Example I are introduced into 480 grams of concentrated sulfuric acid of 96 per cent strength. The solution is cooled down to zero centigrade. 20 grams of potash chromate are poured in while cooling to maintain the temperature always between zero and 10° centigrade. When all the potash chromate is introduced, the mass is still stirred for several hours at ordinary temperature longer when a sample dissolved in a solution of soda in excess yields a blue coloration. The mass is poured into ice water, filtered, washed and treated in the manner described in Example I.

The dyestuff thus obtained yields on chrome mordant fibre analogous tints to that of the dyestuff of Example I.

What I claim is:—

1. A process for the preparation of mordant dyestuffs consisting in condensing a quinone-dianilido-compound obtained from one molecular proportion of chlorinated benzo-quinone and two molecular proportions of an amino-salicylic acid body, in concentrated sulfuric acid.

2. A process for the preparation of mordant dyestuffs consisting in condensing a quinone-dianilido-compound obtained from one molecular proportion of chloranil and two molecular proportions of an amino-salicylic acid body, in concentrated sulfuric acid.

3. A process for the preparation of mordant dyestuffs consisting in condensing a quinone-dianilido-compound obtained from one molecular proportion of chloranil and two molecular proportions of a derivative of amino-salicylic acid, in concentrated sulfuric acid.

4. A process for the preparation of mordant dyestuffs consisting in condensing a quinone-dianilido-compound obtained from one molecular proportion of chloranil and two molecular proportions of para-amino-salicylic acid, in concentrated sulfuric acid.

5. A process for the preparation of mordant dyestuffs consisting in condensing under heat a quinone-dianilido-compound obtained from one molecular proportion of chlorinated benzo-quinone and two molecular proportions of an amino-salicylic acid body, in concentrated sulfuric acid.

6. A process for the preparation of mordant dyestuffs consisting in condensing a quinone-dianilido compound obtained from one molecular proportion of chloranil and two molecular proportions of amino-salicylic acid in concentrated sulfuric acid in combination with an oxydizing agent at a lower temperature.

7. A process for the preparation of mordant dyestuffs consisting in condensing a quinone-dianilido-compound obtained from chloranil and amino-salicylic acid in concentrated sulfuric acid in combination with a nitration to allow of operating at lower temperature.

8. A process for the preparation of mordant dyestuffs consisting in condensing a quinone-dianilido-compound obtained from chloranil and amino-salicylic acid in concentrated sulfuric acid and thereupon treating the compound by nitration.

9. As new articles of manufacture, the herein described mordant dyestuffs resulting from the condensation, in concentrated sulfuric acid, of a quinone-dianilido-compound obtained from chlorinated benzoquinone and an amino-salicylic acid body and dyeing the fibre of very fast, dark violet-blue tints, having their tinctorial properties intensified by introduction of nitro groups and being soluble in water in form of alkali salts.

10. As new articles of manufacture, the herein described mordant dyestuffs resulting from the condensation, in concentrated sulfuric acid, of a quinone-dianilido-compound obtained from chloranil and an amino-salicylic acid body and dyeing the fibre of very fast, dark violet-blue tints, having their tinctorial properties intensified by introduction of nitro groups and being soluble in water in form of alkali salts.

In witness whereof I have hereunto signed my name this 26th day of April, 1923, in the presence of two subscribing witnesses.

THÉODORE LOMBARD.

Witnesses:
 ERNST BODMER,
 AMAND FRANCE.